(12) United States Patent
Evans

(10) Patent No.: US 8,936,312 B2
(45) Date of Patent: Jan. 20, 2015

(54) ENERGY ABSORBING SEAT FOR A VEHICLE

(75) Inventor: Jonathan Evans, Canton, MI (US)

(73) Assignee: BASF SE, Ludwigshafen (DE)

(*) Notice: Subject to any disclaimer, the term of this patent is extended or adjusted under 35 U.S.C. 154(b) by 0 days.

(21) Appl. No.: 13/822,934

(22) PCT Filed: Sep. 14, 2011

(86) PCT No.: PCT/US2011/051571
§ 371 (c)(1),
(2), (4) Date: Mar. 13, 2013

(87) PCT Pub. No.: WO2012/037233
PCT Pub. Date: Mar. 22, 2012

(65) Prior Publication Data
US 2013/0169011 A1 Jul. 4, 2013

Related U.S. Application Data

(60) Provisional application No. 61/382,582, filed on Sep. 14, 2010.

(51) Int. Cl.
*B60N 2/427* (2006.01)
*B60N 2/42* (2006.01)
*B60N 2/68* (2006.01)

(52) U.S. Cl.
CPC .......... *B60N 2/42709* (2013.01); *B60N 2/4228* (2013.01); *B60N 2/42745* (2013.01); *B60N 2/68* (2013.01); *B60N 2/682* (2013.01)
USPC ................................. 297/216.13; 297/452.18

(58) Field of Classification Search
CPC ..................................................... B60N 2/427
USPC ........................................ 297/216.13, 452.18
See application file for complete search history.

(56) References Cited

U.S. PATENT DOCUMENTS 3,544,164 A 12/1970 Ohta
3,802,737 A 4/1974 Mertens
(Continued)

FOREIGN PATENT DOCUMENTS

DE 4421946 A1 6/1995
DE 19831218 A1 1/2000
(Continued)

OTHER PUBLICATIONS

English language abstract and machine-assisted English translation for DE 4421946 extracted from the espacenet.com database on Jun. 21, 2013, 16 pages.
(Continued)

*Primary Examiner* — Anthony D Barfield
(74) *Attorney, Agent, or Firm* — Howard & Howard Attorneys PLLC

(57) ABSTRACT

A seat supports an occupant of a vehicle. The seat comprises a seating frame member for providing a surface to support the occupant and a back frame member extending away from the seating frame member. The back frame member defines a U-shaped cavity. A boss is coupled to the back frame member within the U-shaped cavity. A fastening element extends through the boss and the back frame member. The fastening element deforms the boss and the back frame member when a force above a predetermined value is applied to the back frame member thereby causing the back frame member to rotate relative to the seating frame member. Allowing the back frame member to rotate relative to the seating frame member reduces an impact force transferred from the seat to the occupant caused by the force above the predetermined value.

18 Claims, 10 Drawing Sheets

(56) References Cited

U.S. PATENT DOCUMENTS

| | | | |
|---|---|---|---|
| 4,109,959 | A | 8/1978 | Barecki et al. |
| 4,192,545 | A | 3/1980 | Higuchi et al. |
| 4,249,769 | A | 2/1981 | Barecki |
| 4,598,950 | A | 7/1986 | Fourrey |
| 4,997,233 | A | 3/1991 | Sharon |
| 5,219,202 | A | 6/1993 | Rink et al. |
| 5,249,840 | A | 10/1993 | Hoshihara et al. |
| 5,310,247 | A | 5/1994 | Fujimori et al. |
| 5,447,360 | A | 9/1995 | Hewko et al. |
| 5,509,716 | A | 4/1996 | Kolena et al. |
| 5,676,421 | A | 10/1997 | Brodsky |
| 5,697,478 | A | 12/1997 | Di Stefano |
| 6,003,937 | A | 12/1999 | Dutton et al. |
| 6,022,074 | A | 2/2000 | Swedenklef |
| 6,053,571 | A | 4/2000 | Faigle |
| 6,109,690 | A | 8/2000 | Wu et al. |
| 6,142,563 | A | 11/2000 | Townsend et al. |
| 6,520,577 | B2 | 2/2003 | Kitagawa |
| 6,523,893 | B2 | 2/2003 | Kamper et al. |
| 6,641,214 | B2 | 11/2003 | Veneruso |
| 6,709,053 | B1 | 3/2004 | Humer et al. |
| 6,761,412 | B1 | 7/2004 | Garnweidner et al. |
| 6,820,931 | B2 | 11/2004 | Ruff et al. |
| 6,926,358 | B2 | 8/2005 | Fujita et al. |
| 7,070,236 | B2 | 7/2006 | Kawashima |
| 7,354,105 | B2 | 4/2008 | Nelson et al. |
| 7,537,283 | B2 | 5/2009 | Niitsuma et al. |
| 7,854,477 | B2 | 12/2010 | Axelsson et al. |
| 7,992,934 | B2 | 8/2011 | Cailleteau |
| 2004/0061364 | A1 | 4/2004 | Humer et al. |
| 2004/0135400 | A1 | 7/2004 | Matsuzaki et al. |
| 2005/0145597 | A1 | 7/2005 | Kull et al. |
| 2006/0103191 | A1 | 5/2006 | De Wilde et al. |
| 2008/0038569 | A1 | 2/2008 | Evans et al. |
| 2008/0100104 | A1 | 5/2008 | Axelsson et al. |
| 2009/0001786 | A1 | 1/2009 | Haglund |
| 2009/0021061 | A1 | 1/2009 | Yamaki et al. |
| 2010/0096892 | A1 | 4/2010 | Meghira et al. |
| 2010/0176621 | A1 | 7/2010 | Aufrere et al. |
| 2010/0194157 | A1 | 8/2010 | Nitsuma et al. |
| 2010/0259076 | A1 | 10/2010 | Meghira et al. |
| 2011/0043008 | A1 | 2/2011 | Reel |

FOREIGN PATENT DOCUMENTS

| | | |
|---|---|---|
| EP | 0709249 A2 | 5/1996 |
| EP | 0888926 A1 | 1/1999 |
| EP | 2127941 A1 | 12/2009 |
| FR | 2927581 A1 | 8/2009 |
| JP | 10-309968 A | 11/1998 |
| WO | WO 2006/083024 A1 | 8/2006 |
| WO | WO 2006/093644 A1 | 9/2006 |
| WO | WO 2012/037218 A1 | 3/2012 |
| WO | WO 2012/037222 A2 | 3/2012 |

OTHER PUBLICATIONS

English language abstract and machine-assisted English translation for DE 19831218 extracted from the espacenet.com database on Jun. 21, 2013, 18 pages.

English language abstract and machine-assisted English translation for EP 0888926 extracted from the espacenet.com database on Jun. 21, 2013, 31 pages.

English language abstract for EP 2127941 extracted from the espacenet.com database on Jun. 25, 2013, 17 pages.

English language abstract and machine-assisted English translation for FR 2927581 extracted from the espacenet.com database on Jun. 25, 2013, 37 pages.

English language abstract and machine-assisted English translation for JP 10-309968 extracted from the PAJ database on Jun. 25, 2013, 43 pages.

International Search Report for Application No. PCT/US11/51554 dated Feb. 13, 2012, 2 pages.

International Search Report for Application No. PCT/US11/51558 dated Feb. 16, 2012, 2 pages.

International Search Report for Application No. PCT/US11/51571 dated Feb. 13, 2012, 2 pages.

English language abstract for WO 2006/083024 extracted from espacenet.com database on Oct. 30, 2014, 2 pages.

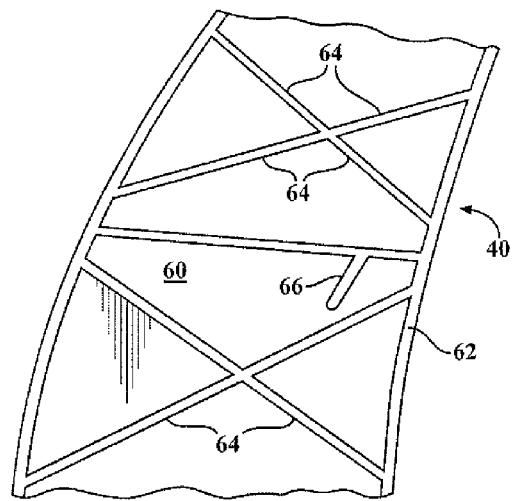
FIG. 6
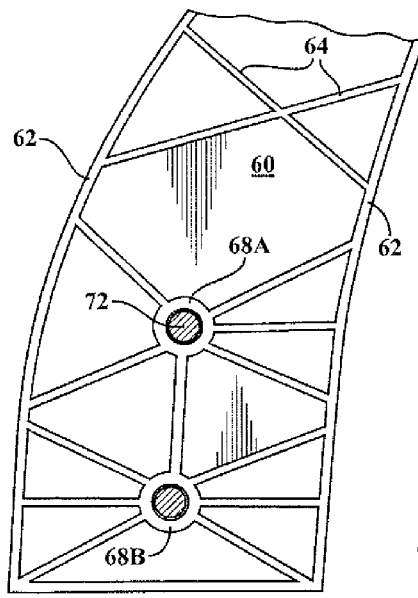 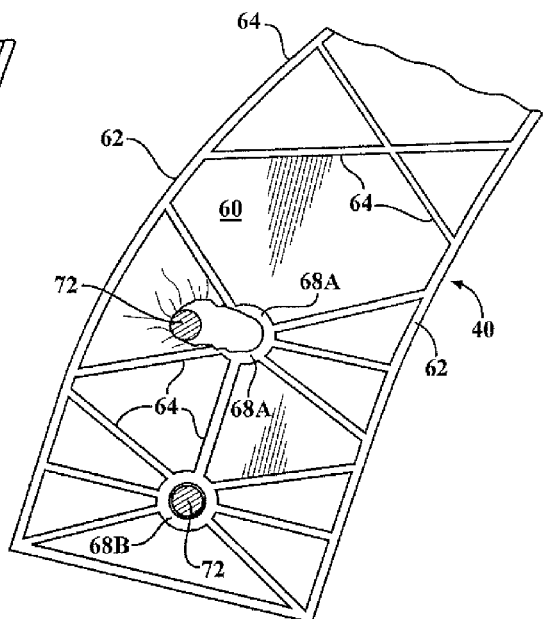
FIG. 9　　FIG. 10

United States Patent

ENERGY ABSORBING SEAT FOR A VEHICLE

CROSS REFERENCE TO RELATED APPLICATIONS

This application is the National Stage of International Patent Application No. PCT/US2011/051571, filed on Sep. 14, 2011, which claims priority to and all the advantages of U.S. Provisional Patent Application Ser. No. 61/382,582 filed on Sep. 14, 2010 and incorporated herewith in its entirety.

BACKGROUND OF THE INVENTION

1. Field of the Invention

The subject invention generally relates to a seat for a vehicle, and more specifically to the seat having at least one energy absorbing feature.

2. Description of the Related Art

Seats for a vehicle and specifically a back portion of the seat typically must meet structural requirements by having sufficient strength to support repeated loads, which are exerted on the back portion of the seat, or seat back, during a crash event. For example, when a vehicle is hit from behind by another vehicle, a mass of an occupant applies a large force on the seat back over a small time period. To meet these structural requirements, the seat back is generally formed from metal such as steel, aluminum, or magnesium. For example, the seat back made from steel is able to meet the structural requirements by providing sufficient stiffness, strength, and ductility to satisfy the above-mentioned requirements.

Recently, more features and content have been designed into the seat back. As a result, a cost to manufacture the seat back has increased. In order to reduce costs, seat backs previously manufactured from metals are now being manufactured from a polymeric material. The seat backs produced from the polymeric material offer the ability to reduce the number of features and content designed into the seat back and therefore reduce manufacturing and assembly costs. Furthermore, weight reduction is another possible benefit of using polymeric material for the seat back, as well as greater design freedom and reduced profile, giving the vehicle increased interior space. However, the seat back made from the polymeric material must still meet the structural requirements for a crash event. For example, during a rear impact collision, the vehicle is accelerated in a forward direction. This causes the seat back to apply acceleration forces to the occupant over a short period of time. Therefore, the seat backs are typically required to manage the acceleration forces applied to the occupant while not exceeding deformation limits.

SUMMARY OF THE INVENTION AND ADVANTAGES

A seat supports an occupant of a vehicle. The seat comprises a seating frame member for providing a surface to support the occupant. The seat also comprises a back frame member extending away from the seating frame member. The back frame member defines a U-shaped cavity. The back frame member has a base portion and two or more leg portions extending from the base portion to define the U-shaped cavity. The seat includes a bracket coupled to both the seating frame member and the back frame member. A boss is coupled to the base portion within the U-shaped cavity. A bore is defined by and extends axially through the boss. A fastening element is received by the bore and extends through the boss, the base portion, and the bracket for coupling the bracket to the back frame member. The fastening element deforms the boss and the base portion when a force above a predetermined value is applied to the back frame member thereby causing the back frame member to rotate relative to the seating frame member. Allowing the back frame member to rotate relative to the seating frame member reduces an impact force transferred from the seat to the occupant caused by the force above the predetermined value. Therefore, the back frame member can be designed to withstand forces up to the predetermined value to ensure it remains intact during the collision event. Reducing the impact force experienced by the occupant reduces the likelihood of the occupant sustaining injuries as a result of a collision of the vehicle.

BRIEF DESCRIPTION OF THE DRAWINGS

Other advantages of the present invention will be readily appreciated, as the same becomes better understood by reference to the following detailed description, when considered in connection with the accompanying drawings wherein:

FIG. 6 is a side view of the back frame member showing a finger extending from a plurality of ribs;

FIG. 9 is a side view of the back frame member showing a fastening element disposed within a boss;

FIG. 10 is a side view of the back frame member showing the fastening element rupturing the boss and shearing through the back frame member;

DETAILED DESCRIPTION OF THE INVENTION

Figure 1:
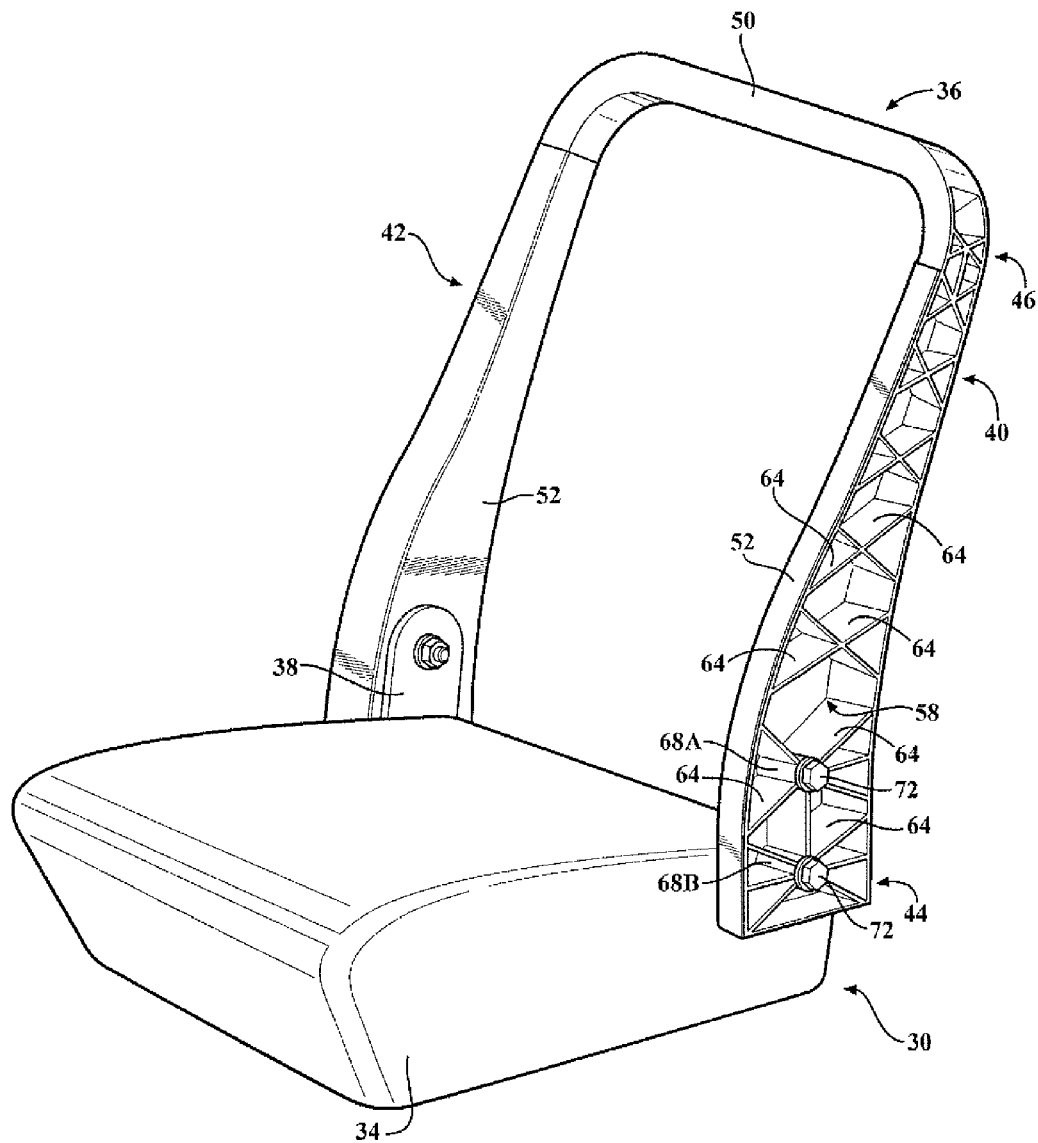
FIG. 1 is a perspective view of a seat including a back frame member and a seating frame member.

Referring to the Figures, wherein like numeral indicate like or corresponding parts throughout the several views, a seat 30 for a vehicle is generally shown. The seat 30 is coupled to the vehicle for supporting an occupant 32 in a standard position within the vehicle. With reference to FIG. 1, the seat 30 includes a seating frame member 34 extending generally horizontally and a back frame member 36 coupled to and extending away from the seating frame member 34. A bracket 38 is coupled to both the seating frame member 34 and the back frame member 36 for coupling the seating frame member 34 to the back frame member 36.

Figure 2:
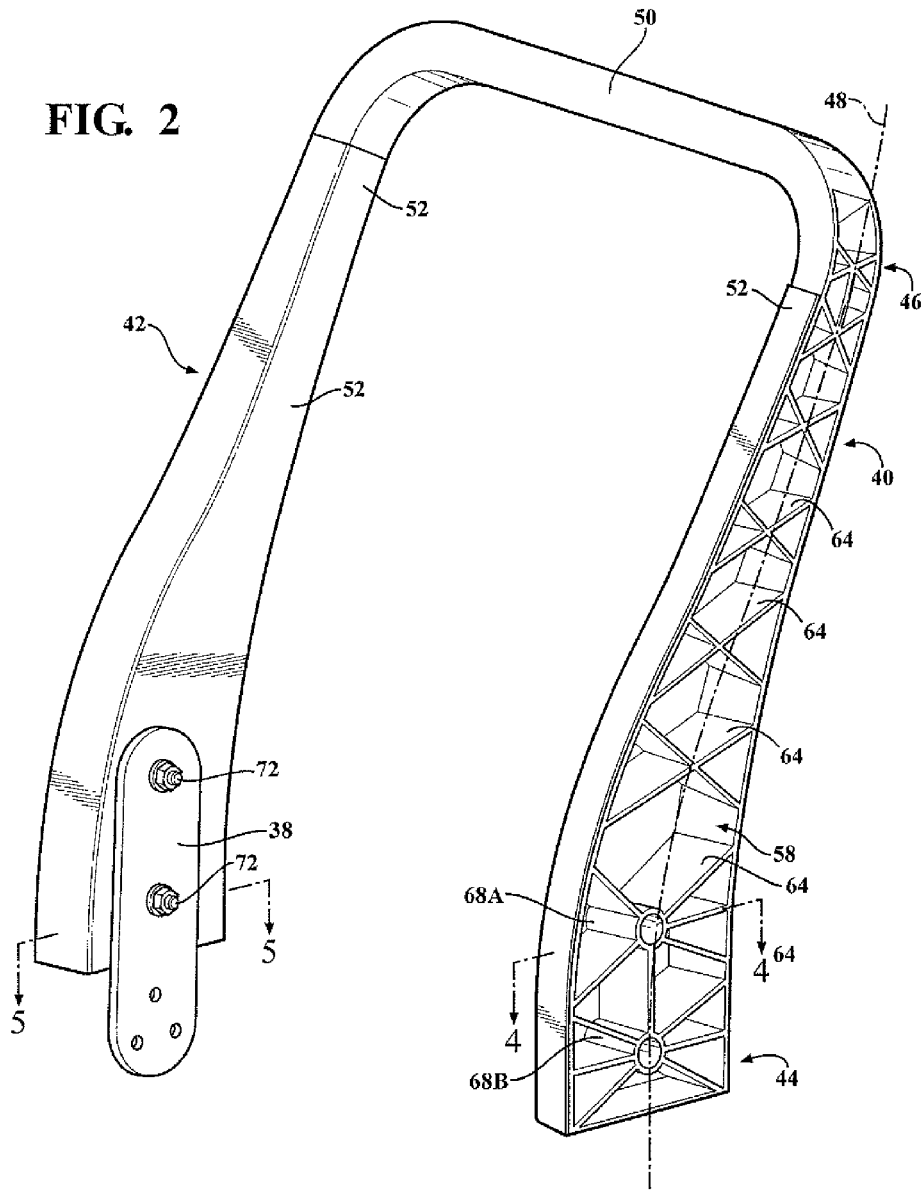
FIG. 2 is a perspective view of the back frame member of the seat.

The back frame member 36 generally extends vertically away from the seating frame member 34. The back frame member 36 may include a first side member 40 and a second side member 42 each extending generally upwardly from the seating frame member 34. The side members 40, 42 each have a proximal end 44 proximate the seating frame member 34 and a distal end 46 spaced from the seating frame member 34. With reference to FIG. 2, each of the side members 40, 42 define a side member axis 48 extending from the proximal end 44 to the distal end 46 of the side members 40, 42 dividing each of the side members 40, 42 in half. A top member 50 may be disposed between the side members 40, 42 at the distal end 46 of the side members 40, 42. Generally, the top member 50 rigidly coupled the first and second side members 40, 42 together. The top member 50 may also receive a headrest of the seat 30. It is to be appreciated that when employed, the top member 50 may be integral with the side members 40, 42 or may be a separate discrete component.

The back frame member 36 may comprise a polymeric material. The polymeric material is typically a thermoplastic material for allowing the side members 40, 42 to be injection molded. For example, the polymeric material of the side members 40, 42 may comprise a polyamide. When employed, the polyamide is selected from the group of nylon 6, nylon 6/6 and combinations thereof. The polyamide may be a fiber reinforced polyamide. An example of a suitable fiber reinforced polyamide is a glass-fiber reinforced polyamide that is commercially available from BASF Corporation under the trade name Ultramid® TG7S PA6. It should be appreciated that the side members 40, 42 may be formed from any type of suitable polymeric material, polyamide or not, reinforced or not, without departing from the nature of the present invention.

Figure 3:
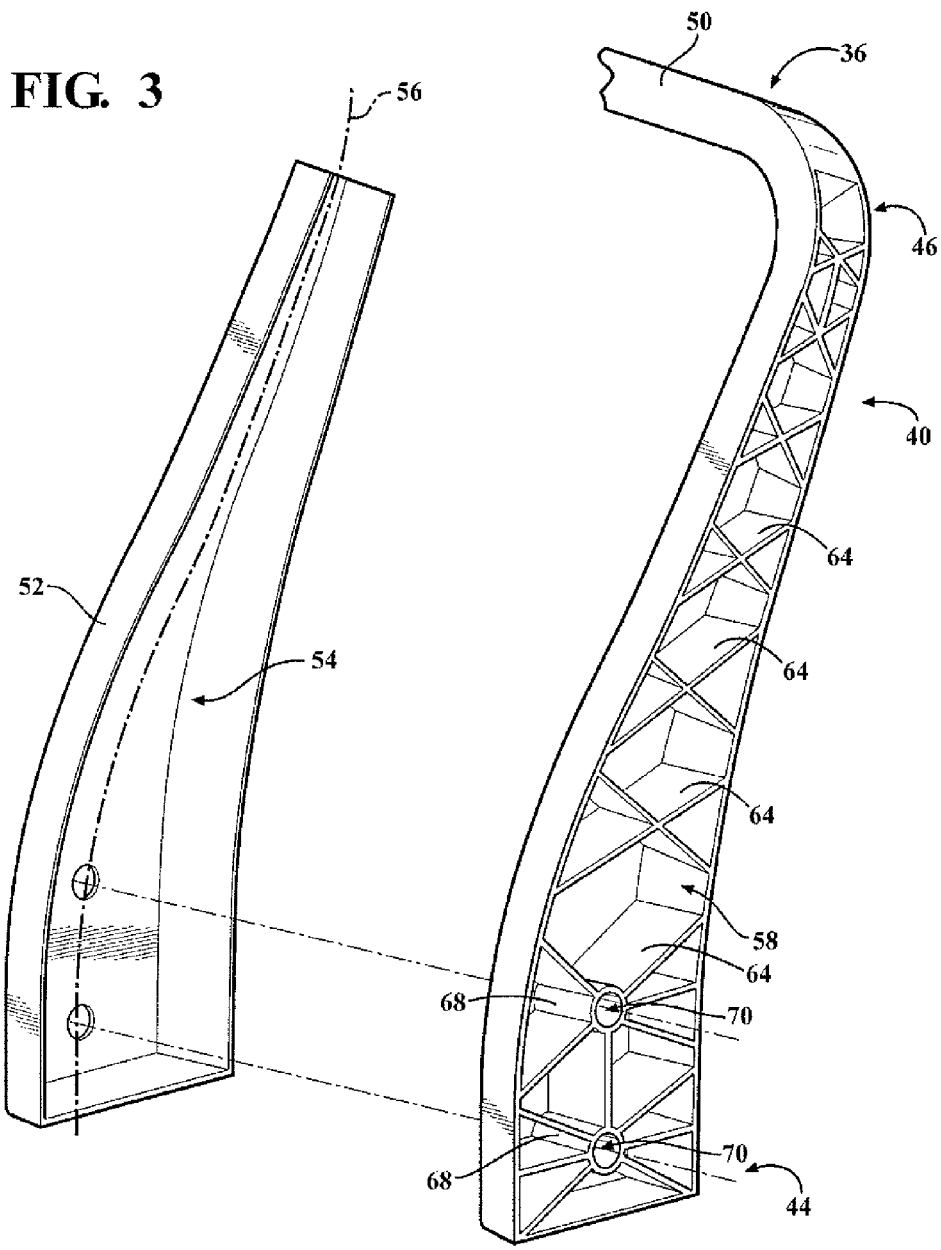
FIG. 3 is perspective assembly view of the back frame member of the seat having a reinforcing mat disposed about the back frame member.

As best shown in FIG. 3, the seat 30 may include a reinforcing mat 52 disposed about the back frame member 36. When employed, the reinforcing mat 52 imparts strength to the back frame member 36 for allowing the back frame member 36 to endure greater loads without failure as compared to the back frame member 36 without the reinforcing mat 52. The reinforcing mat 52 defines a cavity 54 presenting a general U-shaped cross-section for receiving the back frame member 36. Generally, the reinforcing mat 52, by itself, is flexible about a longitudinal axis 56 extending along the reinforcing mat 52 and may buckle when subjected to a load. As such, the back frame member 36 supports the reinforcing mat 52 to prevent flexing and buckling of the reinforcing mat 52 along the longitudinal axis 56. It is to be appreciated that when the first and second side members 40, 42 are present, the reinforcing mat 52 is disposed about each of the first and second side members 40, 42.

Typically, the reinforcing mat 52 comprises a glass-fiber filled polymeric material. It is to be appreciated that the glass-filled polymeric material may be the polymeric material of the back frame member 36 described above. Alternatively, the glass-filled polymeric material may be different from the polymeric material of the back frame member 36. Generally, glass fibers within the glass-filled polymeric material extend along the longitudinal axis 56 of the reinforcing mat 52. However, the plurality of fibers may extend in different directions or may be woven, i.e., interlaced with each other. Typically, the glass fibers are elongated such that stress on the reinforcing mat 52 is transmitted from the glass-filled polymeric material to the glass fibers. Transferring the stress allows the glass fibers to reinforce the glass-filled polymeric material.

The glass-filled polymeric material of the reinforcing mat 52 may be integrated with the glass fibers in a variety of ways. For example, the reinforcing mat 52 may be in the form of a continuous fiber reinforced mat that is preformed and subsequently integrated with the glass-filled polymeric material. An example of a suitable continuous fiber reinforced mat is that which is commercially available from Performance Materials Corporation of Camarillo, Calif. under the trade name Continuous Fiber Reinforced Thermoplastic (CFRT).

Figure 4:
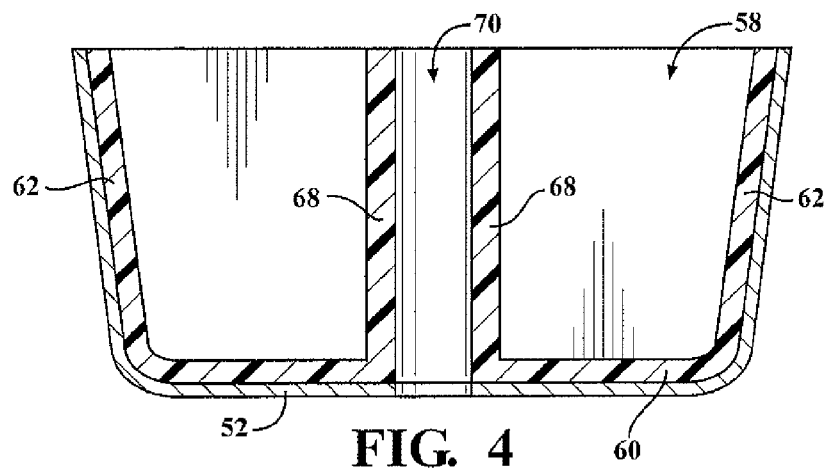
FIG. 4 is a cross-sectional view of the back frame member taken along line 4-4 of FIG. 2.
Figure 5:
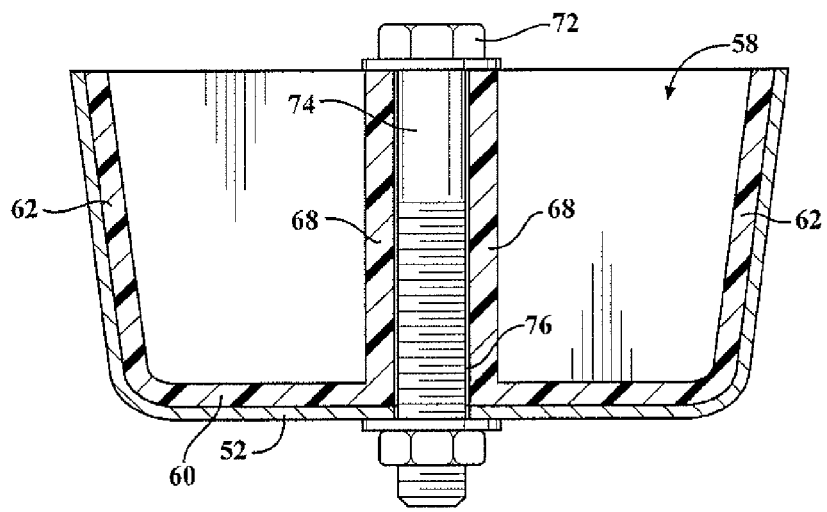
FIG. 5 is a cross-sectional view of the back frame member taken along line 5-5 of FIG. 2.

With reference to FIGS. 1-3, the back frame member 36 defines a U-shaped cavity 58 for providing the back frame member 36 with rigidity. With reference to FIGS. 4 and 5, generally, the back frame member 36 includes a base portion 60 and two or more leg portions 62 extending from the base portion 60 to define the U-shaped cavity 58. The leg portions 62 are spaced from each other along the base portion 60. Typically, one of the leg portions 62 is adjacent the occupant 32 sitting in the seat 30 and the other leg portions 62 are spaced from the leg portion 62 adjacent the occupant 32 in a direction away from the occupant 32. It is to be appreciated that the base portion 60 and the leg portions 62 may be integrally formed. When present, the reinforcing mat 52 wraps around the base portion 60 and the leg portions 62. Additionally, when present, each of the first and second side members 40, 42 have the base portion 60 and the leg portions 62 for defining the U-shaped cavity 58.

As best shown in FIGS. 1-3, a plurality of ribs 64 may be disposed within the U-shaped cavity 58 of the back frame member 36. Generally, the ribs 64 are coupled to the base portion 60 and the leg portions 62 of the back frame member 36 for reinforcing the back frame member 36. It is to be appreciated that the ribs 64 may be disposed within the U-shaped cavity 58 in any configuration suitable to reinforce the back frame member 36. Generally, the ribs 64 are arranged in a series of intersecting pairs to form a criss-cross configuration. As shown in FIG. 6, a finger 66 may extend from the ribs 64 proximate one of the leg portions 62 of the back frame member 36. The finger 66 will be described in detail below.

With reference to FIGS. 1-3, the seat 30 further comprises a boss 68 coupled to the base portion 60 of the back frame member 36. The boss 68 is disposed within the U-shaped cavity 58. When present, the ribs 64 within the U-shaped cavity 58 may also be coupled to the boss 68 for supporting the boss 68 within the U-shaped cavity 58. For example, the ribs 64 may be coupled to the base portion 60 of the back frame member 36, the leg portions 62 of the back frame member 36, and the boss 68. It is to be appreciated that the ribs 64 and the boss 68 may be integral with one another such that the ribs 64 and the boss 68 are formed simultaneously. Alternatively, the boss 68 may be a discrete component relative to the ribs 64.

The boss 68 defines a bore 70 extending axially through the boss 68. The base portion 60 defines an upper fastening hole aligned with the bore 70 of the boss 68. A fastening element 72 is received by the bore 70 of the boss 68. The fastening element 72 extends through the boss 68, the upper fastening hole of the base portion 60, and the bracket 38 for coupling the bracket 38 to the back frame member 36. The fastening element 72 has a cylindrical shaft 74 in contact with the boss 68.

As shown in FIG. 5, the seat 30 may include a sleeve 76 disposed within the bore 70 of the boss 68 for preventing the boss 68 from being compressed when the fastening element 72 couples the bracket 38 to the back frame member 36. Generally, the sleeve 76 comprises a material with a compressive strength greater than a compressive strength of the boss 68, such as steel.

Figure 7:
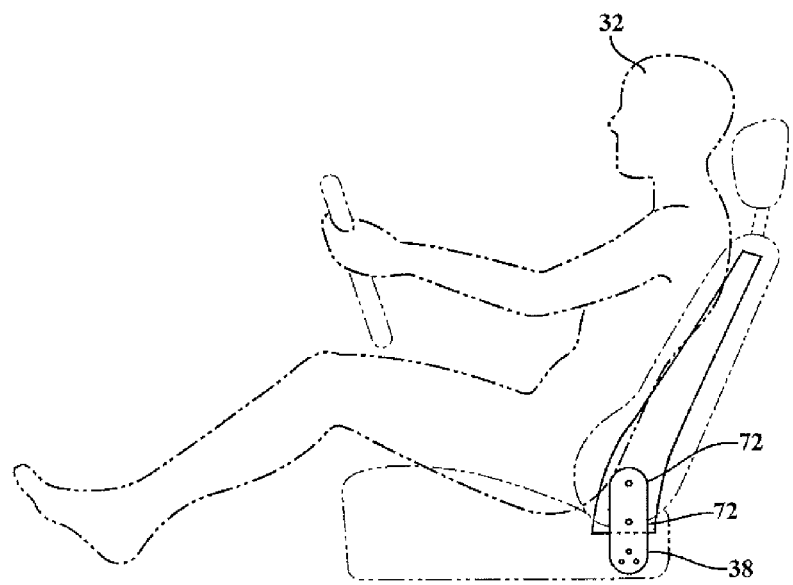
FIG. 7 is a schematic view of an occupant supported by the seat.
Figure 8:
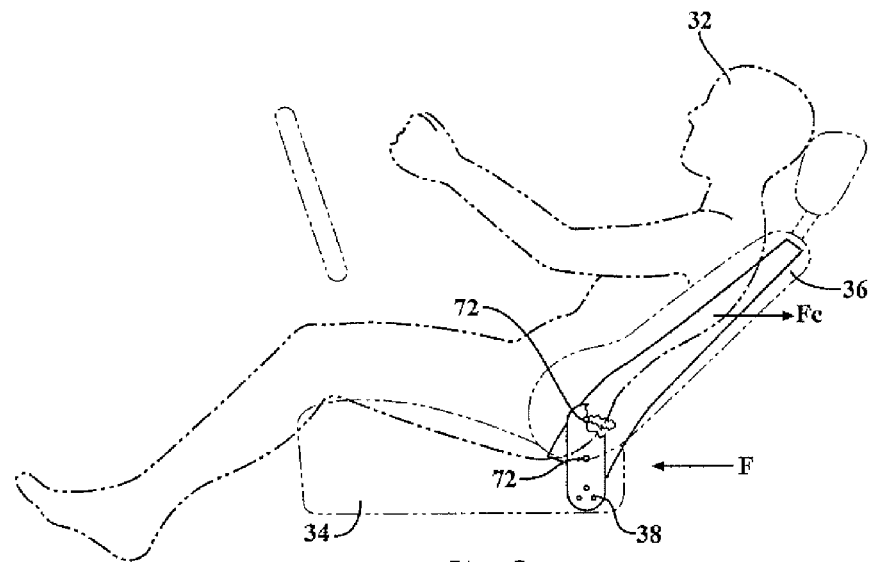
FIG. 8 is a schematic view of the occupant causing the back frame member to rotate relative to the seating frame member.

Generally, during a collision event, such as a rear end collision, the occupant 32 sitting in the seat 30 is impacted by the back frame member 36 of the seat 30 as the vehicle is abruptly accelerated forward. As a result, the occupant 32 applies a collision force to the seat 30 and conversely, the seat 30 applies an impact force, which is related to the collision force, to the occupant 32. However, the impact force can be reduced compared to the collision force by providing an energy absorbing feature to dissipate a portion of the collision force. As shown in FIGS. 7 and 8, generally, the energy absorbing feature allow for a safe displacement of occupant 32 relative to the seating frame member 34. As such, the energy absorbing feature deforms during the collision event thereby safely dissipating the portion of the energy of the collision force, which in turn reduces the impact force experienced by the occupant 32.

The boss 68 is the energy absorbing feature and deforms as the occupant 32 applies the collision force to the back frame member 36. Specifically, as shown in FIGS. 9 and 10, when the collision force is a force above a predetermined value, the fastening element 72 deforms the boss 68 and the base portion 60 of the back frame member 36 thereby causing the back frame member 36 to rotate relative to the seating frame member 34. It is to be appreciated that the force above the predetermined value is higher than the normal loads applied to the back frame member 36 during the course of normal operation of the vehicle. Said differently, the boss 68 does not deform under normal, non-collision loads.

The rotation of the back frame member 36 reduces the impact force transferred from the seat 30 to the occupant 32 caused by the force above the predetermined value. Generally, the fastening element 72 deforms the boss 68, the base portion 60, and, if present, the reinforcing mat 52 when the force above the predetermined value is applied to the back frame member 36. When the sleeve 76 is present, the fastening element 72 contacts the sleeve 76 and the sleeve 76 deforms the boss 68 when the force above the predetermined value is applied to the back frame member 36.

Generally, the deformation of the boss 68 continues until the collision force is entirely dissipated or the boss 68 ruptures. The cylindrical shaft 74 of the fastening element 72 contacts the boss 68 to rupture the boss 68. Once the boss 68 is ruptured, the back frame member 36 continues to rotate relative to the seating frame member 34 and the cylindrical shaft 74 of the boss 68 shears through the base portion 60 of the back frame member 36 and, if present, the reinforcing mat 52. Generally, the shearing of the base of the back frame member 36 and the reinforcing mat 52 continues until the collision force is entirely dissipated or the fastening element 72 contacts one of the leg portions 62 of the back frame member 36. Because the fastening element 72 is designed to shear through the base portion 60 of the back frame member 36, the seat 30 is free of a shear plate, which must be separately added to the seat 30.

The deformation of the boss 68 and the shearing of the base portion 60 of the back frame member 36 results in a displacement of the occupant 32 from the standard position toward the back frame member 36 of the seat 30, as shown in FIG. 8. Generally, the greater the deformation of the boss 68, the greater the displacement of the occupant 32 thereby reducing the impact force experienced by the occupant 32. The displacement of the occupant 32 is dependent on a stiffness of the boss 68, i.e., the higher the stiffness of the boss 68, the less displacement the occupant 32 experiences. The displacement of the occupant 32 is also dependent on a shear strength of the base, and, if present, the reinforcing mat 52, i.e., the greater the shear strength, the less displacement the occupant 32 experiences. Therefore, the displacement of the occupant 32 during the collision event can be controlled by the stiffness of the boss 68 and the shear strength of the base and the reinforcing mat 52. However, the stiffness of the boss 68 must be sufficient to resist normal loads applied to the seat 30, such as when the occupant 32 enters and exits the seat 30, without deforming and rupturing the boss 68.

Figure 11:
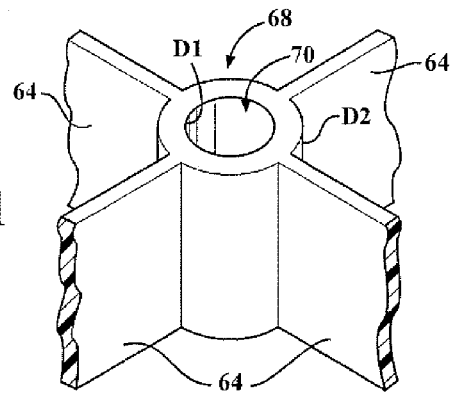
FIG. 11 is an perspective view of a portion of the back frame member showing the boss.

The stiffness of the boss 68 is dependent on the cross-sectional thickness of the boss 68. As shown in FIG. 11, the cross-sectional thickness of the boss 68 is defined between an inner diameter D1, which defines said bore 70, and an outer diameter D2. As such, the cross-sectional thickness may be varied as needed to resist deformation and rupture under normal loads. Additionally, the boss 68 may have a designed weak point for controlling a direction of deformation of the boss 68 caused by the fastening element 72 as the back frame member 36 rotates relative to the seating frame member 34.

Figure 12:
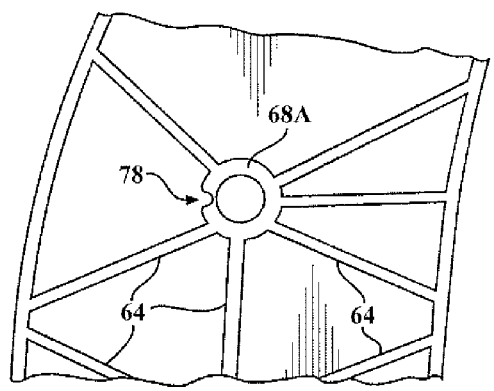
FIG. 12 is a side view of the boss having a boss notch.
Figure 13:
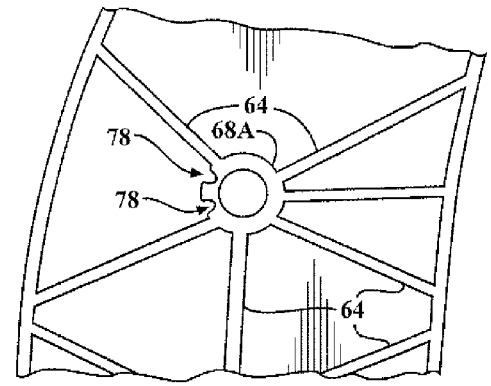
FIG. 13 is a side view of the boss having two boss notches.
Figure 14:
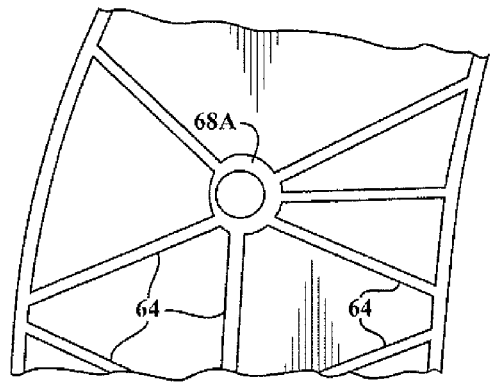
FIG. 14 is a side view of the boss showing a portion of the boss having a thinner cross-sectional thickness.
Figure 15:
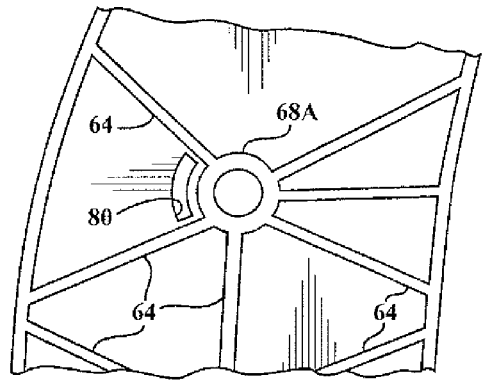
FIG. 15 is a side view of the back frame member showing a relief hole defined adjacent the boss.

As shown in FIGS. 12-14, the cross-sectional thickness may be reduced in a selected location of the boss 68 for providing the designed weak point of the boss 68. Said differently, the thickness of the boss 68 is reduced, thereby creating a weaker point in the boss 68 as compared to the non-reduced thickness. As such, when the fastening element 72 is forced against the inner diameter of the boss 68, the fastening element 72 is likely to deform and rupture the boss 68 at the designed weak point. Therefore, as shown in FIG. 12, the boss 68 may define at least one boss notch 78 for reducing the cross-sectional thickness at the boss notch 78 to provide the designed weak point of the boss 68. It is to be appreciated that the boss 68 may extend from an outer diameter D2 of the boss 68 towards the bore 70. Alternatively, the boss notch 78 may be in communication with the bore 70 such that the inner diameter D1 of the boss 68 defines the boss notch 78. As shown in FIG. 13, the boss 68 may define two boss notches 78. As shown in FIG. 14, the boss 68 may have a thinner cross-sectional thickness in the selected location as compared to the cross-sectional thickness of the rest of the boss 68. The thinner cross-sectional thickness is a designed weak point for controlling the rupture of the boss 68. As shown in FIG. 15, the base portion 60 may define a relief hole 80 adjacent the boss 68 for providing the designed weak point.

The boss 68 may comprise any suitable material meeting the stiffness requirements necessary to resist the normal loads applied to the back frame member 36. The boss 68 may comprise a polymeric material. It is to be appreciated that the polymeric material of the boss 68 may be the same as the polymeric material of the back frame member 36. As such, the boss 68 may be integrally formed with the back frame member 36. Alternatively, the polymeric material of the boss 68 may be different from the polymeric material of the back frame member 36. Typically, the polymeric material of the boss 68 is selected from the group of nylon 6, nylon 6/6, and combinations thereof.

Figure 16:
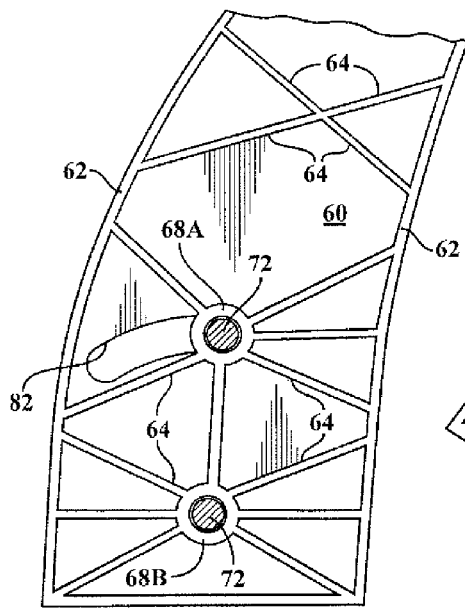
FIG. 16 is a side view of the back frame member defining a guide channel.
Figure 17:
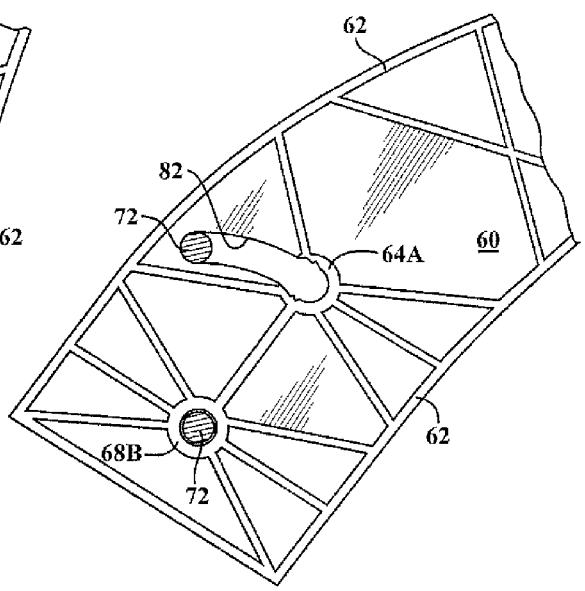
FIG. 17 is a side view of the back frame member with the fastening element moved along the guide channel and the back frame member rotated relative to the seating frame member.

As shown in FIGS. 16 and 17, the base portion 60 of the back frame member 36 may define a guide channel 82 for guiding the fastening element 72 as the back frame member 36 rotates relative to the seating frame member 34. The guide channel 82 also guides the fastening element 72 as the fastening element 72 shears through the base portion 60 of the back frame member 36 such that the fastening element 72 is moveable along the guide channel 82. The back frame member 36 may include a stop element for limiting movement of the fastening element 72 in the guide channel 82 to limit rotation of the back frame member 36 relative to the seating frame member 34.

It is to be appreciated that the boss 68 may be further defined, as an upper boss 68A and the seat 30 may further comprise a lower boss 68B spaced from the upper boss 68A. The lower boss 68B is coupled to the base portion 60 within the U-shaped cavity 58 similar to the upper boss 68A. When the lower boss 68B is present, the base portion 60 defines a lower fastening hole aligned with the bore 70 of the lower boss 68B. The lower boss 68B receives another fastening element 72 such that the fastening elements 72 are disposed through a respective one of the upper boss 68A and the lower boss 68B for coupling the bracket 38 to the back frame member 36. When the lower boss 68B is present, the back frame member 36 rotates about the lower boss 68B as the upper boss 68A is deformed by the fastening element 72. More specifically, the bracket 38 maintains a position of the fastening elements 72 relative to each other and relative to the seating frame member 34 as the back frame member 36 rotates relative to the seating frame member 34. Therefore, the back frame member 36 rotates about the fastening element 72 received by the lower boss 68B and the fastening element 72 received by the upper boss 68A deforms the upper boss 68A and the base portion 60 of the back frame member 36.

Figure 18:
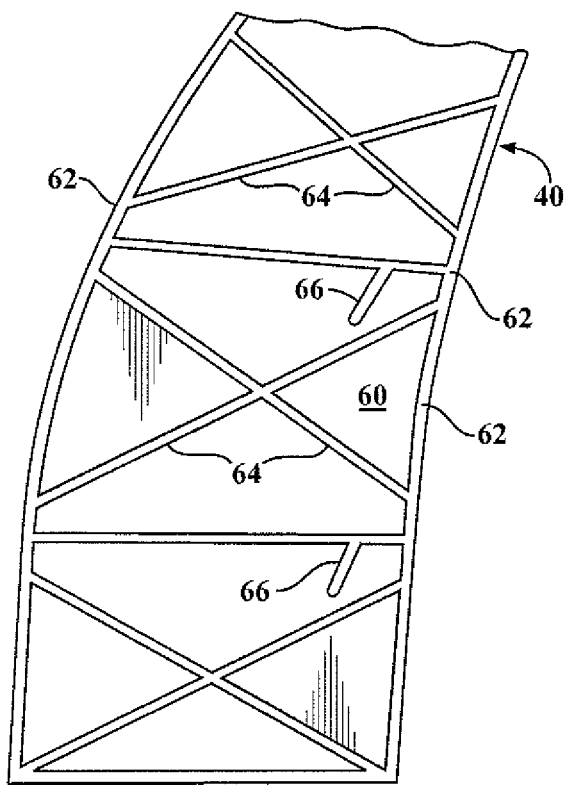
FIG. 18 is a side view of the back frame member showing the fingers extending from the ribs.
Figure 19:
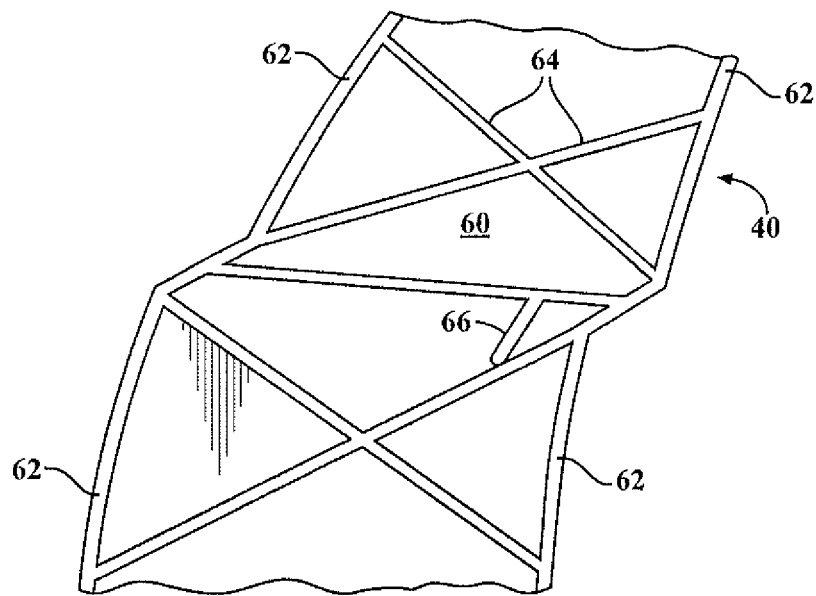
FIG. 19 is a side view showing the back frame member buckling and contacting the finger.

The seat 30 may include other energy absorbing features. For example, as shown in FIGS. 18-19, when employed, the finger 66 may also be the energy absorbing feature by deforming as the back frame member 36 buckles under the collision force with a portion of the back frame member 36 impacting the finger 66. Specifically, as the occupant 32 applies the collision force to the back frame member 36, the back frame member 36 may buckle resulting in a portion of the back frame member 36 rupturing and being introduced into the U-shaped cavity 58. Once the portion of the back frame member 36 intrudes into the U-shaped cavity 58, the portion of the back frame member 36 contacts the finger 66 causing the finger 66 to deform. The buckling of the back frame member 36 and the deformation of the finger 66 results in the displacement of the occupant 32 from the standard position toward the back frame member 36 of the seat 30. As described above, the greater the displacement of the occupant 32, the greater the reduction of the impact force as compared to the collision force. It is believed that the deformation of the finger 66 and the buckling of the back frame member 36 reduces the impact force applied to the occupant 32.

Figure 20:
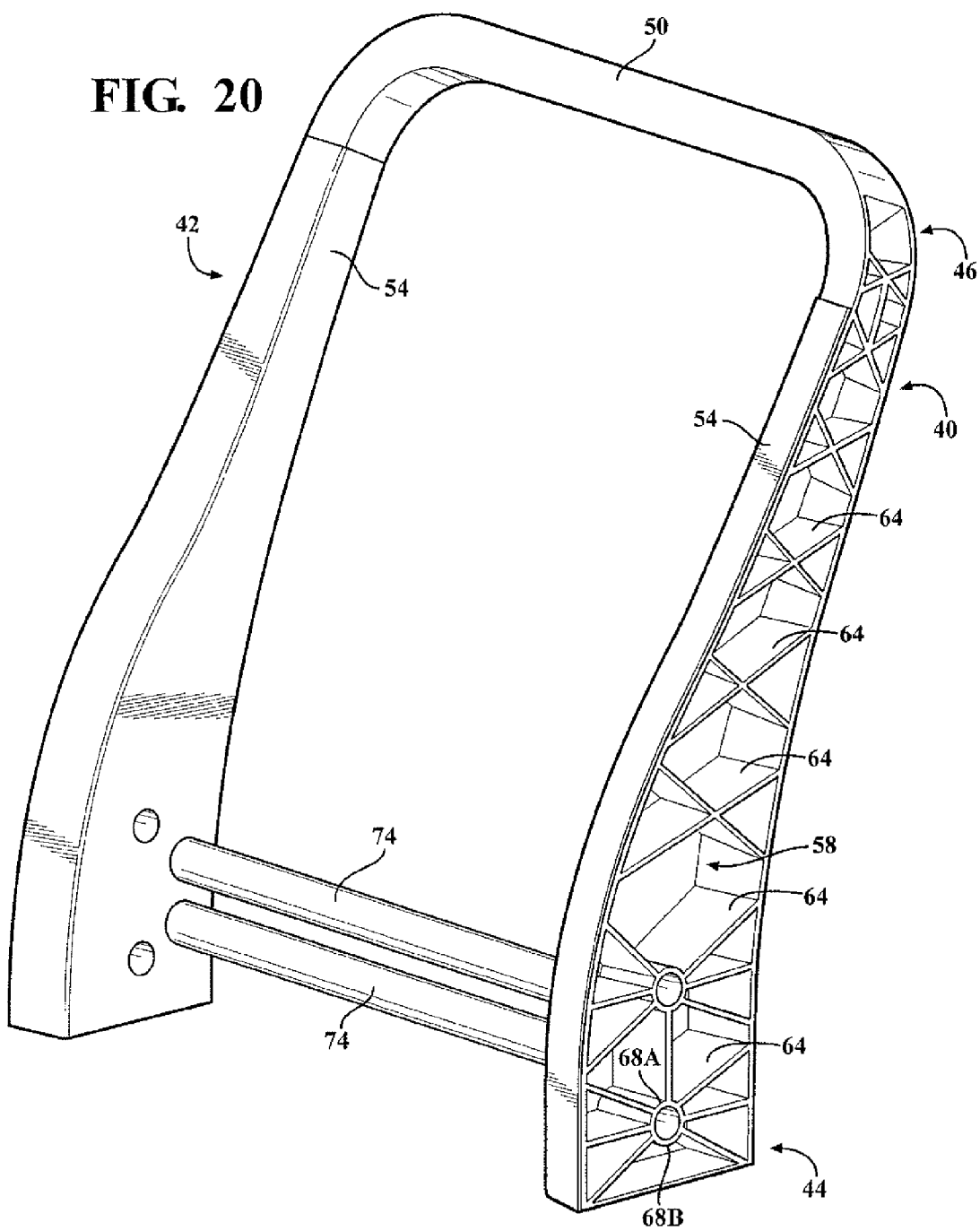
FIG. 20 is a perspective view of the seat having a cross member coupled to the back frame member.

As shown in FIG. 20, the seat 30 may include at least one cross member 74 disposed between the first and second side members 40, 42, with the cross member 74 acting as an additional energy absorbing feature. Additional description of the cross member 74 is disclosed in co-pending application serial number PCT/US2011/051558, the contents of which are incorporated by reference.

During the collision event, the cross member 74 deforms under the collision force applied by the occupant 32. Specifically, the cross member 74 is stretched resulting in a necking of the cross member 74. The deformation of the cross member 74 results in the displacement of the occupant 32 from the standard position toward the back frame member 36 of the seat 30. As stated above, the greater the displacement of the occupant 32 the greater the reduction of the impact force as compared to the collision force. Furthermore, the bracket 38 may be the energy absorbing feature and designed to deform as the back frame member 36 rotates relative to the seating frame member 34. Additional description of the bracket 38 used as the energy absorbing feature is disclosed in co-pending application serial number PCT/US2011/051554, the contents of which are incorporated by reference.

Generally, the impact force experienced by the occupant 32 as a result of the collision force can be minimized with the energy absorbing feature while still satisfying safe displacement requirements for the back frame member 36 of the seat 30. With the energy absorbing feature, the impact force is managed over a longer time period, thereby reducing a peak impact force acting on the occupant 32. With the reduction of the peak impact force, the occupant 32 experiences less injury and the seat 30 also experiences lower stress levels. As a result of the seat 30 experiencing lower stress levels, more optimal designs can be utilized, and the polymeric materials can be used to manage the collision force.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention.

What is claimed is:

1. A seat for supporting an occupant of a vehicle, said seat comprising:
    a seating frame member for providing a surface to support the occupant;
    a back frame member extending away from said seating frame member with said back frame member defining a U-shaped cavity defined by a base portion and two or more leg portions extending from said base portion;
    a bracket coupled to both said seating frame member and said back frame member;
    a boss coupled to said base portion within said U-shaped cavity with a bore defined by and extending axially through said boss; and
    a fastening element received by said bore with said fastening element extending through said boss, said base portion, and said bracket for coupling said bracket to said back frame member whereby said fastening element deforms said boss and said base portion when a force above a predetermined value is applied to said back frame member thereby causing said back frame member to rotate relative to said seating frame member to reduce an impact force transferred from said seat to the occupant caused by the force above the predetermined value.

2. A seat as set forth in claim 1 wherein said fastening element has a cylindrical shaft in contact with said boss whereby said cylindrical shaft ruptures said boss and shears through said base portion as said back frame member rotates relative to said seating frame member.

3. A seat as set forth in claim 1 wherein said boss has a designed weak point for controlling a direction of deformation of said boss caused by said fastening element when said back frame member rotates relative to said seating frame member.

4. A seat as set forth in claim 3 wherein said boss has a cross-sectional thickness defined between an inner diameter, which defines said bore, and an outer diameter with said cross-sectional thickness reduced in a selected location of said boss for providing said designed weak point of said boss.

5. A seat as set forth in claim 4 wherein said boss defines at least one boss notch for reducing said cross-sectional thickness at said selected location of said boss to provide said designed weak point of said boss.

6. A seat as set forth in claim 5 wherein said boss notch extends from an outer periphery of said boss towards said bore.

7. A seat as set forth in claim 1 wherein said boss comprises a polymeric material.

8. A seat as set forth in claim 7 wherein said back frame member comprises said polymeric material and said boss is integrally formed with said back frame member.

9. A seat as set forth in claim 8 wherein said polymeric material is selected from the group of nylon 6, nylon 6/6, and combinations thereof.

10. A seat as set forth in claim 9 further comprising a reinforcing mat disposed about said base portion and said leg portions of said back frame member with said reinforcing mat comprising a glass-fiber filled polymeric material for imparting strength to said back frame member with said fastening element deforming said boss, said base portion, and said reinforcing mat when the force above the predetermined value is applied to said back frame member.

11. A seat as set forth in claim 1 wherein said base portion defines a guide channel with said fastening element moveable along said guide channel as said fastening element shears through said base portion for guiding said fastening element as said back frame member rotates relative to said seating frame member.

12. A seat as set forth in claim 11 wherein said back frame member includes a stop element for limiting movement of said fastening element in said guide channel to limit rotation of said back frame member relative to said seating frame member.

13. A seat as set forth in claim 1 further comprising a plurality of ribs disposed within said U-shaped cavity of said back frame member with said ribs coupled to said base portion, said leg portions, and said boss for supporting said boss within said U-shaped cavity.

14. A seat as set forth in claim 13 wherein said ribs comprise a polymeric material and are integral with said boss and said back frame member.

15. A seat as set forth in claim 1 wherein said boss is further defined as an upper boss and said seat further comprises a lower boss spaced from said upper boss and coupled to said base portion within said U-shaped cavity with said lower boss receiving another fastening element such that said fastening elements are disposed through a respective one of said upper boss and said lower boss for coupling said bracket to said back frame member.

16. A seat as set forth in claim 15 wherein said bracket maintains a position of said fastening elements relative to each other and relative to said seating frame member as said back frame member rotates relative to said seating frame member such that said back frame member rotates about said fastening element received by said lower boss and said fastening element received by said upper boss deforms said upper boss and said base portion of said back frame member.

17. A seat as set forth in claim 1 further comprising a sleeve disposed within said bore of said boss for preventing said boss from being compressed when said fastening element couples said bracket to said back frame member whereby said fastening element contacts said sleeve and said sleeve deforms said boss when the force above the predetermined value is applied to said back frame member.

18. A seat as set forth in claim 1 wherein said seat is free of a shear plate disposed about said fastening element.

* * * * *